United States Patent [19]
Bird et al.

[11] Patent Number: 5,473,747
[45] Date of Patent: Dec. 5, 1995

[54] METHOD AND APPARATUS FOR IDENTIFYING FEATURES IN A MULTIDIMENSIONAL DATA SET

[75] Inventors: Colin Bird; Syd Chapman, both of Hampshire, United Kingdom

[73] Assignee: International Business Machines Corporation, Armonk, N.Y.

[21] Appl. No.: 461,229

[22] Filed: Jun. 5, 1995

Related U.S. Application Data

[63] Continuation of Ser. No. 14,904, Feb. 8, 1993, abandoned.

[51] Int. Cl.$^6$ .................................................. G06F 15/00
[52] U.S. Cl. ...................... 395/161; 395/133; 395/141; 395/119
[58] Field of Search ........................... 395/119, 133, 395/141, 155–161

[56] References Cited

U.S. PATENT DOCUMENTS

| | | | |
|---|---|---|---|
| 4,674,046 | 6/1987 | Oseki et al. | 364/414 |
| 4,775,946 | 10/1988 | Anjyo | 364/522 |
| 4,914,589 | 4/1990 | Crawford | 364/43.17 |
| 5,023,895 | 6/1991 | McCroskey et al. | 378/4 |
| 5,151,856 | 9/1992 | Halmann et al. | 364/413.03 |
| 5,204,055 | 4/1993 | Sachs et al. | 419/2 |
| 5,315,512 | 5/1994 | Roth | 364/413.25 |
| 5,340,656 | 8/1994 | Sachs et al. | 428/546 |
| 5,345,490 | 9/1994 | Finnigan et al. | 378/4 |

FOREIGN PATENT DOCUMENTS

| | | |
|---|---|---|
| 0455439 | 11/1991 | European Pat. Off. . |
| 58-195977 | 11/1983 | Japan . |

OTHER PUBLICATIONS

*IBM Journal of Research and Development*, vol. 27, No. 4, Jul. 1983, New York "Color Display and Interactive Interpretation of Three-Dimensional Data", E. J. Farrell et al, pp. 356–366.

*Primary Examiner*—Mark R. Powell
*Assistant Examiner*—Robert Andrews
*Attorney, Agent, or Firm*—David A. Mims, Jr.; Mark S. Walker

[57] ABSTRACT

An interactive data interpretation tool is disclosed for enabling the identification of the position of features in a multidimensional data set, the tool comprising means for displaying an image representing a 2-D slice of the data set; and user input means for causing the storage of the position of a feature in the displayed image, characterized in that the 2-D slice can be displayed as part of a projection of a 3-D image, the third dimension of which corresponds to one of the other dimensions of the data set, the tool comprising means operable in response to a predetermined user input operation to cause the co-ordinate of the currently displayed 2-D slice in the third dimension of the 3-D image to be incremented, and the positions in the 3-D image of any features identified in the previously displayed slice to be indicated. The invention finds particular application to the interpretation of seismological data sets. Other applications include oceanographic and medical imaging data sets.

18 Claims, 2 Drawing Sheets

METHOD AND APPARATUS FOR IDENTIFYING FEATURES IN A MULTIDIMENSIONAL DATA SET

This is a continuation of application Ser. No. 08/014,904 filed Feb. 8, 1993, now abandoned.

BACKGROUND OF THE INVENTION

1. Field of the Invention

The invention relates to data interpretation tools.

2. Background and Related Art

One important and time-consuming task which often needs to be carried out in the interpretation of multidimensional data sets, such as might be produced in seismological, oceanographical or medical imaging, is the identification of features, such as surfaces or horizons, embedded in the data.

Conventionally, this task is carried out by using a computer display system to display 2-dimensional "slices" of the data set, one at a time. The intersection of the surface or horizon is identified by the operator and marked on each slice in turn. A suitably modified data set is then saved for use in subsequent visualization of the identified surface as a separate process.

A major problem with this technique is that considerable effort is required to constantly check backwards and forwards between the displayed slices to ensure consistency between the marked locations of the intersections of the surface in the different slices. This problem is particularly acute in cases where there is considerable scope for error in the location of the intersection, its identification being largely a matter of judgement on the part of the operator of the device.

One known solution to the problem is to transfer the user identified signature of data features between slices and to edit the signature in the newly displayed slice. While this does reduce the movement between slices, visualization of the identified surface is still required as a separate step.

SUMMARY OF THE INVENTION

This invention solves this problem by enabling an interactive data interpretation tool to be provided for enabling the identification of the positions of features in a multidimensional data set, the tool comprising: means for displaying an image representing a 2-D slice of the data set, and user input means for causing the storage of the position of a feature in the displayed 2-D slice, characterized in that the 2-D slice can be displayed as part of a projection of a 3-D image, the third dimension of which corresponds to one of the other dimensions of the data-set, the tool comprising means operable in response to a predetermined user input operation to cause the coordinate of the currently displayed 2-D slice in the third dimension of the 3-D image to be incremented and the positions in the 3-D image of any features identified in the previously displayed slice to be indicated.

Such a system considerably speeds up and renders more convenient the extraction of features from a multidimensional data set because the user is able to see the slice he is currently working on in the full 3-D context of the features he has already identified in previously interpreted slices. He does not have to continually switch back and forth between displayed slices to ensure consistency of the identified features in different slices. Feature identification and visualization of the identified features take place as a single integrated process.

A series of slices can be "stepped through" and the development of an identified feature running through the surfaces can be monitored by the user and influence the identification of the feature in the currently displayed slice.

In a preferred form of the invention the predetermined user input operation is the pressing of a mouse button or a key on a keyboard when the display cursor is positioned over a predetermined area of the display, which could be either the whole of the display surface or a small area upon which an icon representing, for example, an arrow is displayed.

Preferably the invention is implemented in the form of a computer graphics workstation with a mouse-driven user interface.

The invention finds particular, though not exclusive, application to the interpretation of seismological data sets, for example, for the identification of oil reservoirs. Other applications include oceanographic and medical imaging data sets.

BRIEF DESCRIPTION OF THE DRAWING

An embodiment of the invention will now be described, by way of example only, with reference to the accompanying drawing, wherein.

DETAILED DESCRIPTION

Figure 1:
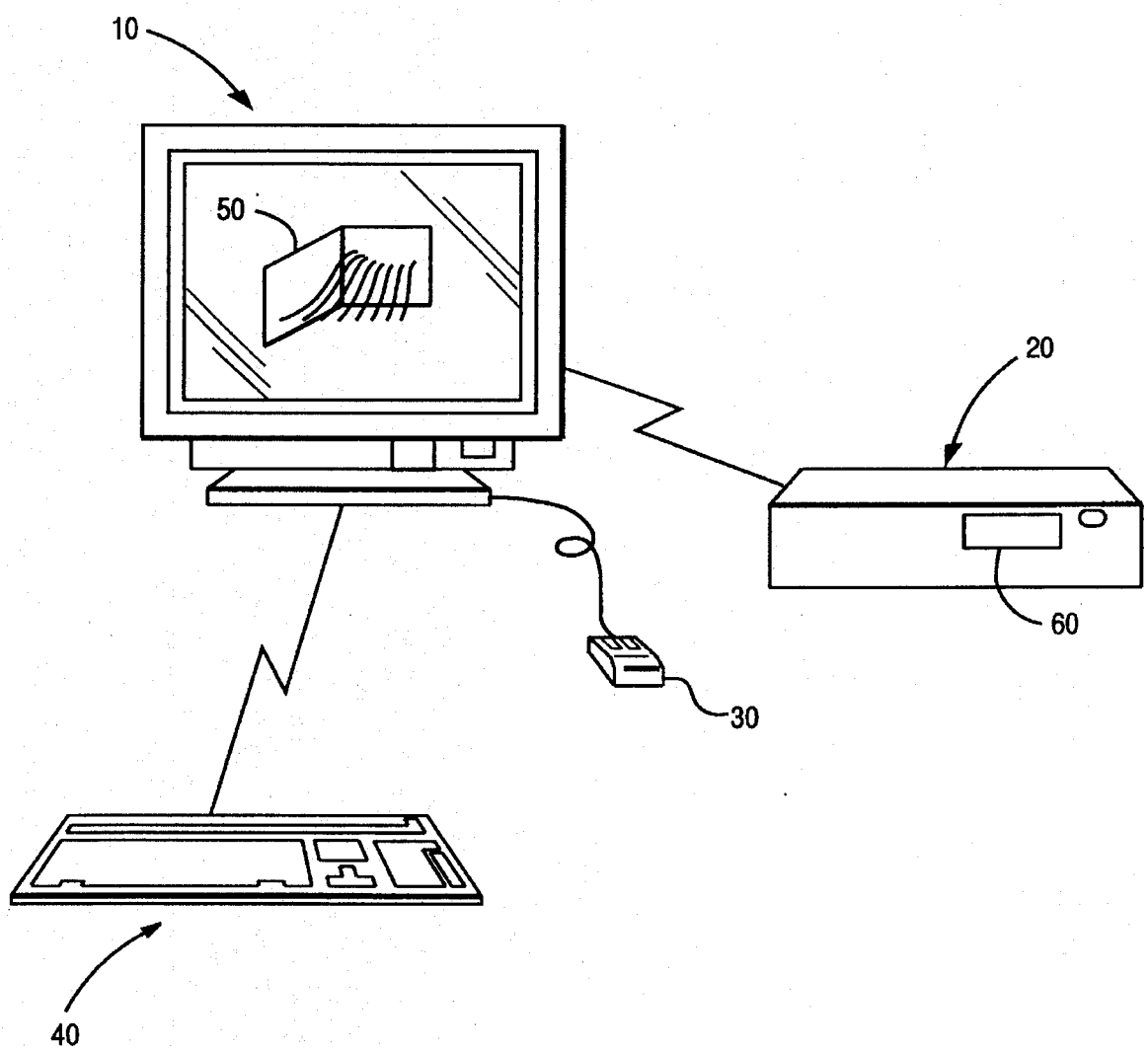
FIG. 1 shows the data interpretation tool of the embodiment of the invention.

The invention is most conveniently put into practice using a suitable computer program running on a conventional general purpose graphics workstation using a graphics subroutine "package" to provide the function necessary to drive the display. A diagram of such a workstation is shown in FIG. 1. It comprises display device 10; system unit 20; and user input devices, mouse 30 and keyboard 40. The system unit 20 includes a disk storage device 60.

A multidimensional data set is stored in disk storage device 60 in an appropriate format. The workstation is programmed to enable the display of 2-D slices of the data set as images 50 on display 10. The slices are displayed as projections of surfaces of a 3-D volume of interest which is generally cuboid. The data contained in the slice can be presented in any suitable manner, for example by color mapping or texture mapping or any other of the conventional 2-D data visualization techniques.

Figure 2:
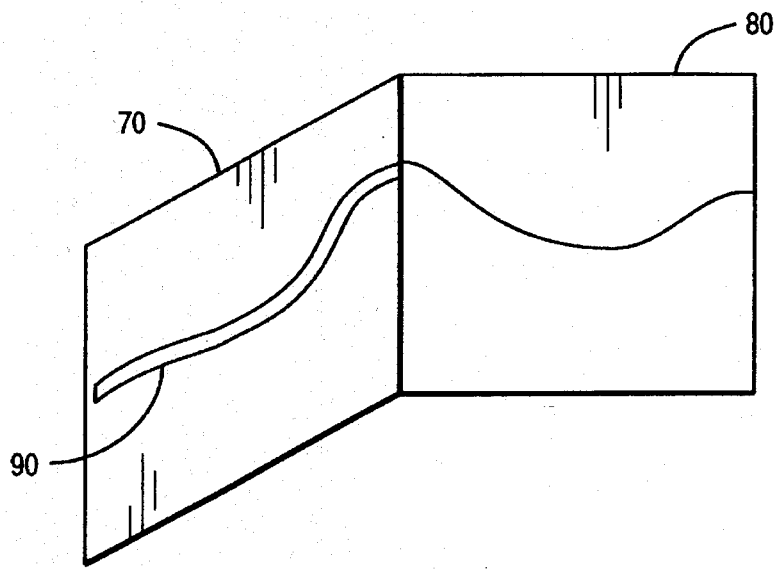
FIGS. 2, 3 and 4 show images displayed by the embodiment of the invention during the data interpretation process.

More than one slice may be displayed as, for example, the back and sides of the cuboid volume. Such a displayed image is shown in FIG. 2. In this case two slices are shown as the left side surface 70 and back surface 80 of the projected cuboid. The system is arranged so that if a feature such as the intersection of a surface with the slice displayed on the left face is identifiable by the user, the user can register the position of this intersection and cause it to be displayed on the screen by "drawing in" the intersection using mouse 30. The registered position is the position of the cursor on the 2-D slice. This "drawn-in" line is indicated on FIG. 2 at 90.

Figure 3:
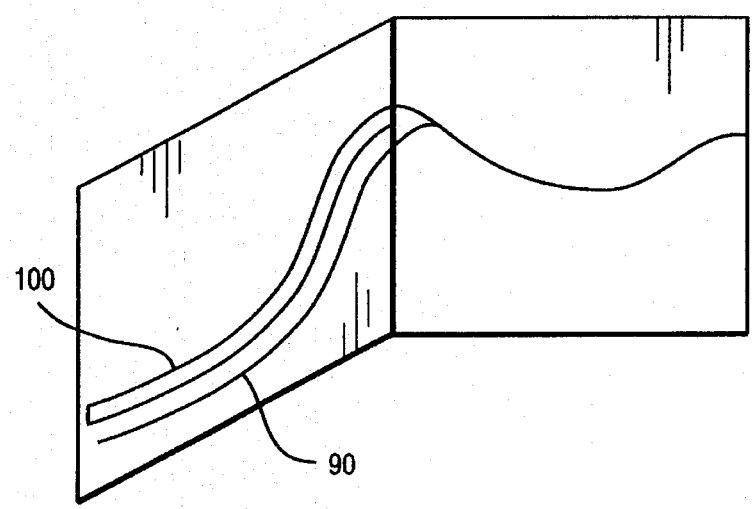

Having identified the position of the intersection in this one slice, the user can cause the display of a neighboring slice in the data set by a user input operation. In this embodiment the user clicks on a mouse button and the co-ordinate of the displayed slice in the third dimension of the cuboid is incremented. However, the previously drawn line is retained in the image, but is displaced in the cuboid. This situation is shown in FIG. 3. The user can then proceed to identify the intersection of the surface with the newly displayed slice and draw in its position in a similar manner as displayed line 100. It will be understood that the user input operation could be the operation of the mouse when the cursor is positioned over a suitable icon.

Figure 4:
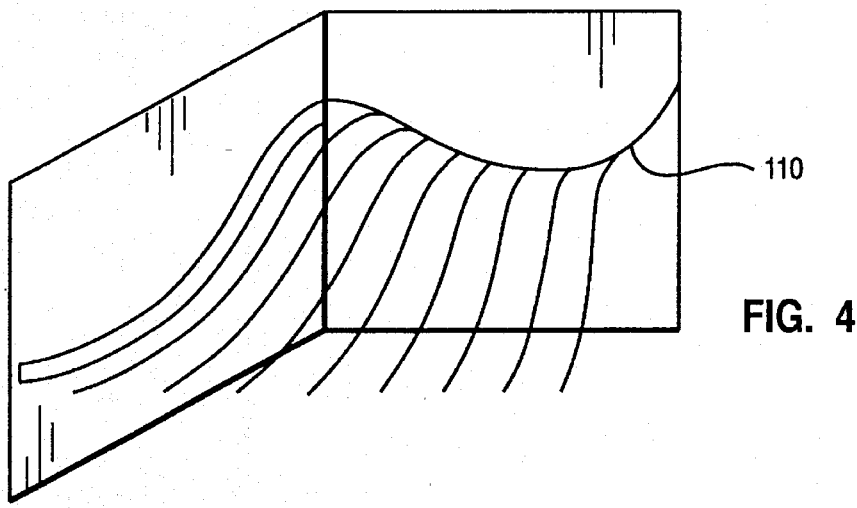

By repeating this operation for a series of slices, a representation 110 of the surface may be extruded from the volume as shown in FIG. 4. The positions of the identified intersections, and thus of the surface, are at the same time stored in an appropriate form in disk storage unit 60.

It will be understood that the ability to increment the co-ordinates of the displayed slice could be arranged to allow such an extrusion to the left, to the right, forwards or backwards, up or down as required.

We claim:

1. A data processing system implemented method for identifying by a user a position of a related feature in a plurality of two-dimensional data slices having a first dimension and a second dimension, comprising:

providing a data set containing said plurality of two-dimensional data slices;

displaying one of said plurality of two-dimensional data slices from said data set to a user at workstation in said data processing system;

projecting a third dimension connected to said displayed two-dimensional data slices containing said first dimension and said second dimension to form a three-dimensional image at said workstation in said data processing system;

identifying by said user at said workstation said position of said related feature within said displayed two-dimensional data slices;

drawing in a line in said third dimension in said three-dimensional image on said workstation representing said position of said related feature within said displayed two-dimensional data slices on said workstation;

replacing said one of said plurality of two-dimensional data slices with a different one of said plurality of two-dimensional slices from said data set while displacing and simultaneously displaying said drawn in line in said third dimension; and repeating the identifying and drawing steps for said different one of said data slices so that said position of said feature can be easily verified by said user in said workstation.

2. A method as in claim 1 wherein said three-dimensional image represents a cuboid volume.

3. A method as in claim 1 wherein said three-dimensional images are stored in a second data set along with the drawn in line from said identifying and drawing steps for later verification of said position of said feature by said user.

4. A method of claim 1 wherein said displaying step includes the presentation of at least two two-dimensional slices to said user at said workstation.

5. A method of claim 1 wherein the position of feature is an intersection of a surface with a horizon in the plurality of two-dimensional data slices in said data set.

6. A method in a data processing system for enabling the identification of a position of a related feature in a plurality of two-dimensional data slices stored in a data set, comprising:

providing said data set containing said plurality of two-dimensional data slices at said workstation in said data processing system;

projecting a left side surface and a back surface to form a three-dimensional image on said workstation;

displaying a selected one of said plurality of two-dimensional data slices from said data set on said back surface of said three-dimensional image to said user at said workstation;

marking the position of said related feature by said user on said selected one of said two-dimensional data slices so that the marking projects into said left side surface of said three-dimensional image; and projecting a different one of said plurality of two-dimensional data slices on the back surface of said three-dimensional images while continuously displaying the marking of the previously selected two-dimensional data slice in said left side surface while repeating said marking step so that said user may verify the position of the feature in said different two-dimensional and selected data slices.

7. The method of claim 6 wherein said three-dimensional image is a cuboid volume.

8. The method of claim 6 wherein the marking on said three-dimensional image is a line.

9. The method of claim 6 wherein the three-dimensional image and the marking on said three-dimensional image is stored in a separate data set.

10. An interactive data interpretation tool for enabling the identification of a position of a related feature in a plurality of two-dimensional data slices stored in a data set, comprising:

means for providing said data set containing said plurality of two-dimensional data slices at said workstation in said data processing system;

means for projecting a left side surface and a back surface to form a three-dimensional image on said workstation;

means for displaying a selected one of said plurality of two-dimensional data slices from said data set on said back surface of said three-dimensional image to said user at said workstation;

means for marking the position of said related feature by said user on said selected one of said two-dimensional data slices so that the marking projects into said left side surface of said three-dimensional image; and means for projecting a different one of said plurality of two-dimensional data slices on the back surface of said three-dimensional image while continuously displaying the marking of the previously selected two-dimensional data slice in said left side surface while repeating said marking so that said user may verify the position of the feature in said different and selected two-dimensional data slices.

11. An interactive data interpretation tool as in claim 10 wherein said three-dimensional image is a cuboid volume.

12. An interactive data interpretation tool as in claim 10 wherein the marking on said three-dimensional image is a line.

13. The interactive data interpretation tool as in claim 10 including means for storing the three-dimensional image and the marking on said three-dimensional image in a separate data set.

14. A program storage device readable by a data processing system, tangibly embodying a program of instructions executable by said data processing system to perform method steps for identifying by a user a position of a related feature in a plurality of two-dimensional data slices having a first dimension and a second dimension, comprising:

providing a data set containing said plurality of two-dimensional data slices;

displaying one of said plurality of two-dimensional data slices from said data set to a user at workstation in said data processing system;

projecting a third dimension connected to said displayed two-dimensional data slices containing said first dimension and said second dimension to form a three-dimensional image at said workstation in said data processing system;

identifying by said user at said workstation said position of said related feature within said displayed two-dimensional data slices;

drawing in a line in said third dimension in said three-dimensional image on said workstation representing said position of said related feature within said displayed two-dimensional data slices on said workstation;

replacing said one of said plurality of two-dimensional data slices with a different one of said plurality of two-dimensional slices from said data set while displacing and simultaneously displaying said drawn in line in said third dimension; and repeating the identifying and drawing steps for said different one of said data slices so that said position of said feature can be easily verified by said user at said workstation.

15. A program storage device as in claim 14 wherein said three-dimensional image represents a cuboid volume.

16. A program storage device as in claim 14 wherein said three-dimensional images are stored in a second data set along with the drawn in line from said identifying and drawing steps for later verification of said position of said feature by said user.

17. A program storage device as in claim 14 wherein said displaying step includes the presentation of at least two two-dimensional slices to said user at said workstation.

18. A program storage device as in claim 14 wherein the position of feature is an intersection of a surface with a horizon in the plurality of two-dimensional data slices in said data set.

* * * * *